United States Patent
Lin et al.

(10) Patent No.: US 11,379,716 B2
(45) Date of Patent: Jul. 5, 2022

(54) METHOD AND ELECTRONIC APPARATUS FOR ADJUSTING A NEURAL NETWORK

(71) Applicant: HTC Corporation, Taoyuan (TW)

(72) Inventors: Yu-Hsun Lin, Taoyuan (TW); Chun-Nan Chou, Taoyuan (TW); Edward Chang, Taoyuan (TW)

(73) Assignee: HTC Corporation, Taoyuan (TW)

(*) Notice: Subject to any disclaimer, the term of this patent is extended or adjusted under 35 U.S.C. 154(b) by 826 days.

(21) Appl. No.: 16/264,704

(22) Filed: Feb. 1, 2019

(65) Prior Publication Data
US 2019/0251433 A1    Aug. 15, 2019

Related U.S. Application Data

(60) Provisional application No. 62/727,570, filed on Sep. 6, 2018, provisional application No. 62/672,596, filed on May 17, 2018, provisional application No. 62/628,311, filed on Feb. 9, 2018.

(51) Int. Cl.
*G06N 3/04*       (2006.01)
*G06N 3/08*       (2006.01)

(52) U.S. Cl.
CPC .............. *G06N 3/08* (2013.01); *G06N 3/04* (2013.01); *G06N 3/0454* (2013.01); *G06N 3/082* (2013.01)

(58) Field of Classification Search
CPC .......... G06N 3/08; G06N 3/04; G06N 3/0454; G06N 3/082
See application file for complete search history.

(56) References Cited

U.S. PATENT DOCUMENTS

| | | | | |
|---|---|---|---|---|
| 10,361,712 | B2* | 7/2019 | Blaettler | H04N 19/13 |
| 11,157,814 | B2* | 10/2021 | Howard | G06N 3/04 |
| 2017/0061326 | A1* | 3/2017 | Talathi | G06N 3/082 |
| 2017/0169313 | A1 | 6/2017 | Choi et al. | |

(Continued)

FOREIGN PATENT DOCUMENTS

| | | |
|---|---|---|
| CN | 106971174 A | 7/2017 |
| CN | 107341548 A | 11/2017 |

(Continued)

OTHER PUBLICATIONS

T. Guo, J. Dong, H. Li and Y. Gao, "Simple convolutional neural network on image classification," 2017 IEEE 2nd International Conference on Big Data Analysis (ICBDA), 2017, pp. 721-724, doi: 10.1109/ICBDA.2017.8078730. (Year: 2017).*

(Continued)

*Primary Examiner* — Hal Schnee
(74) *Attorney, Agent, or Firm* — CKC & Partners Co., LLC

(57) ABSTRACT

A method for adjusting a convolutional neural network includes following operations. The convolutional neural network includes convolution layers in a sequential order. Receptive field widths of the convolution layers in a first model of the convolutional neural network are determined. Channel widths of the convolution layers in the first model are reduced into reduced channel widths according to the receptive field widths of the convolution layers and an input image width. A structure of a second model of the convolutional neural network is formed according to the reduced channel widths. The second model of the convolutional neural network is trained according the structure of the second model.

20 Claims, 14 Drawing Sheets

(56) References Cited

U.S. PATENT DOCUMENTS

| | | | |
|---|---|---|---|
| 2017/0270653 A1 | 9/2017 | Garnavi et al. | |
| 2018/0060729 A1* | 3/2018 | Osogami | G06N 3/08 |
| 2018/0108165 A1* | 4/2018 | Shi | G06V 10/23 |
| 2019/0122113 A1* | 4/2019 | Chen | G06N 3/084 |
| 2019/0171926 A1* | 6/2019 | Chen | G06N 3/0454 |
| 2020/0394520 A1* | 12/2020 | Kruglov | G06N 3/0454 |

FOREIGN PATENT DOCUMENTS

| | | |
|---|---|---|
| CN | 107392314 A | 11/2017 |
| CN | 107729994 A | 2/2018 |

OTHER PUBLICATIONS

Baoyuan Liu, Min Wang, Hassan Foroosh, Marshall Tappen, Marianna Pensky; Proceedings of the IEEE Conference on Computer Vision and Pattern Recognition (CVPR), 2015, pp. 806-814 (Year: 2015).*

Le, Hung, and Ali Borji. "What are the receptive, effective receptive, and projective fields of neurons in convolutional neural networks?." arXiv preprint arXiv:1705.07049 (2017). (Year: 2017).*

Niu Lian-Qiang et al., "Model construction and performance analysis for deep consecutive convolutional neural network", Shenyang University of Technology, vol. 38 No. 6, Nov. 2016, pp. 662-666. Corresponding Chinese office action dated Sep. 27, 2020.

Ariel Gordon et al., "MorphNet: Fast & Simple Resource-Constrained Structure Learning of Deep Networks", 2018 IEEE/CVF Conference on Computer Vision and Pattern Recognition, Nov. 30, 2017, pp. 1586-1595.

Yu-Hsun Lin et al., "MBS: Macroblock Scaling for CNN Model Reduction", arxiv.org, Cornell University Library, 201 Olin Cornell University Ithaca, NY 14853, Sep. 18, 2018.

Huan Wan et al., "Structured Probabilistic Pruning for Convolutional Neural Network Acceleration", Nov. 28, 2017, Retrieved from the Internet: https://arxiv.org/pdf/1709.06994v2.pdf.

Corresponding European search report dated Aug. 8, 2019.
Corresponding European communication dated Aug. 20, 2019.
Corresponding Taiwan office action dated Mar. 19, 2020.

* cited by examiner

METHOD AND ELECTRONIC APPARATUS FOR ADJUSTING A NEURAL NETWORK

CROSS-REFERENCE TO RELATED APPLICATION

This application claims priority to U.S. Provisional Application Ser. No. 62/628,311, filed on Feb. 9, 2018 and U.S. Provisional Application Ser. No. 62/672,596, filed May 17, 2018 and U.S. Provisional Application Ser. No. 62/727,570, filed Sep. 6, 2018, which are herein incorporated by reference.

BACKGROUND

Field of Invention

The disclosure relates to a machine learning method. More particularly, the disclosure relates to a method for adjusting a convolutional neural network.

Description of Related Art

Machine learning technologies are utilized in many applications, such as artificial intelligence (AI), data mining, auto-pilot, etc. There are various types of neural networks developed to solve different kinds of problems. Among these neural networks, a convolutional neural network (CNN) is one of the popular neural networks. The convolutional neural network is usually used to solve image-related problems, such as object recognition.

In a convolutional neural network, multiple convolution layers including a variety of filters are utilized to match or extract features from a source image by a series of convolution calculations. In addition, some pooling layers or activation layers are also included in the convolutional neural network to process the input image and recognize an object from the input image.

SUMMARY

The disclosure provides a method for adjusting a convolutional neural network. The convolutional neural network includes convolution layers in a sequential order. The method includes following operations. Receptive field widths of the convolution layers in a first model of the convolutional neural network are determined. Channel widths of the convolution layers in the first model are reduced into reduced channel widths according to the receptive field widths of the convolution layers and an input image width. A structure of a second model of the convolutional neural network is formed according to the reduced channel widths. The second model of the convolutional neural network is trained.

The disclosure also provides an electronic apparatus suitable for adjusting a convolution neural network. The electronic apparatus include a data storage and a processor. The data storage is configured to store a first model of the convolution neural network. The first model of the convolution neural network includes a plurality of convolution layers. The processor is coupled with the data storage. The processor is configured to determine receptive field widths of the convolution layers in the first model of the convolutional neural network. The processor is further configured to reduce channel widths of the convolution layers in the first model into reduced channel widths according to the receptive field widths of the convolution layers and an input image width. The processor is further configured to form a structure of a second model of the convolutional neural network according to the reduced channel widths. The processor is further configured to train the second model of the convolutional neural network.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
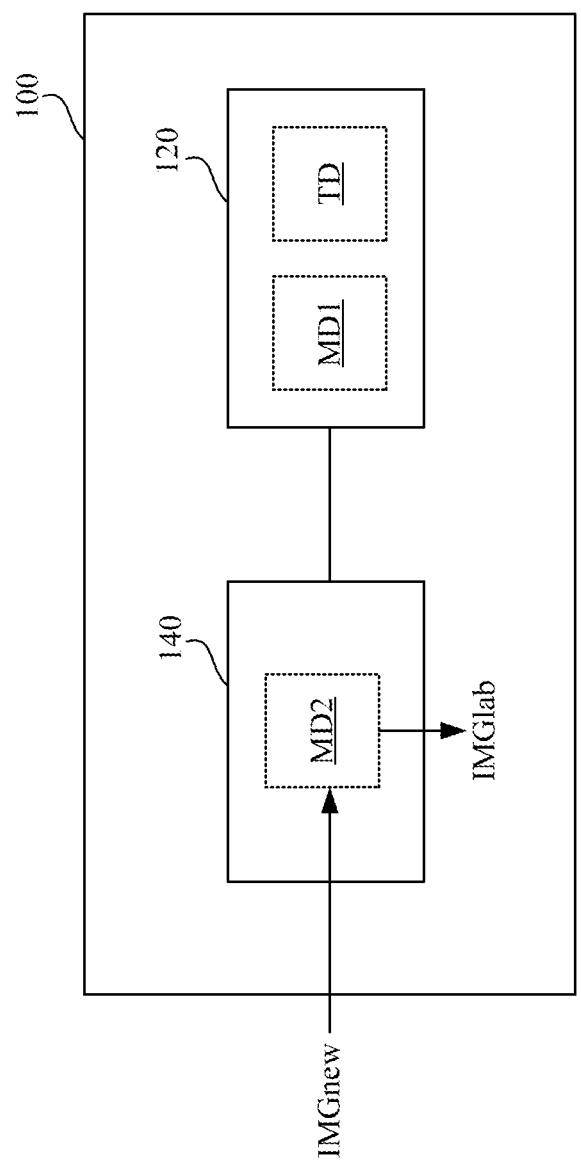
FIG. 1 is a schematic diagram illustrating an electronic apparatus according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which is a schematic diagram illustrating an electronic apparatus 100 according to an embodiment of the disclosure. The electronic apparatus 100 is suitable for adjusting a convolution neural network (CNN).

There are usually several convolution layers included in one convolution neural network. Each of the convolution layers may include several convolution filters for matching and identifying object-related features in images. If the convolution neural network includes more convolution filters in each convolution layers, it will be more precise in recognizing objects. At the same time, when the convolution neural network includes more convolution filters, a model size of the convolution neural network will increase correspondingly. When the model size of the convolution neural network is increased, it requires more time spent in training a model of the convolution neural network, more data storage space to store the model of the convolution neural network, and/or more computation time in recognizing an object. In an embodiment, the electronic apparatus 100 is utilized to reduce a model size of the convolution neural network by adjusting a structure of the model of the convolution neural network.

As shown in FIG. 1, the electronic apparatus 100 includes a data storage 120 and a processor 140. The processor 140 is coupled with the data storage 120. In an embodiment, the data storage can be implemented by a memory, a hard-disk, a cache, a non-transitory computer readable medium, a register, a data storage array or any equivalent data storage components. In an embodiment, the processor can be implemented by a central processing unit, a processing circuit, a graphic processing unit (GPU), an application-specific integrated circuit (ASIC) or any equivalent processing component.

In an embodiment, the data storage 120 stores a first model MD1 of the convolution neural network. In an embodiment, the first model is a pre-trained model of the convolutional neural network. In an embodiment, the pre-trained model can be downloaded from a public convolution neural network library, such as ResNet, MobileNet, SqueezeNet, ShuffleNet, DenseNet, or alike. A structure of the pre-trained model (i.e., the first model MD1) includes a specific amount of convolution layers, and the convolution layers have channel widths in default amounts. However, the first model MD1 is not necessary downloaded from the public convolution neural network library. In another embodiment, the first model MD1 can be trained by the processor 140 according to training data TD stored in the data storage 120.

Figure 2:
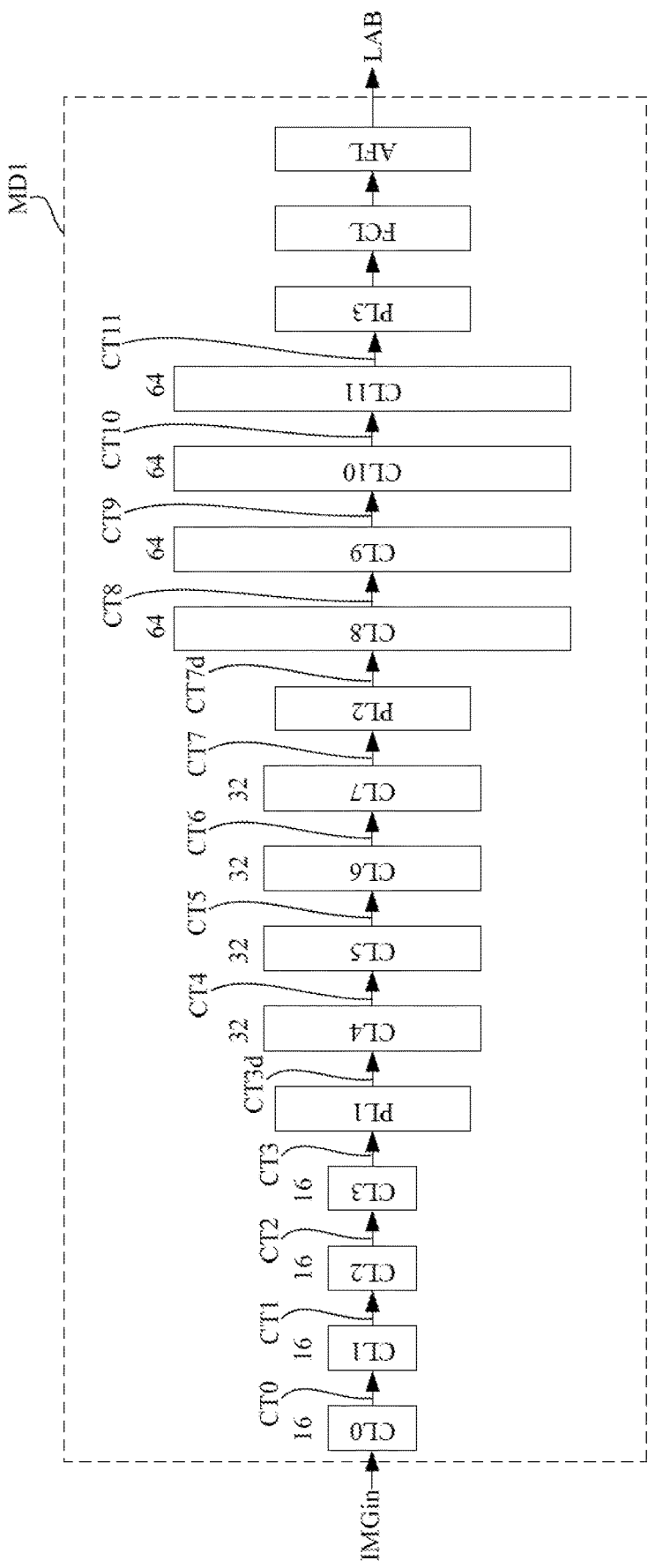
FIG. 2 is a schematic diagram illustrating the first model of the convolution neural network according to an embodiment of the disclosure.

Reference is further made to FIG. 2, which is a schematic diagram illustrating the first model MD1 of the convolution neural network according to an embodiment of the disclosure. In this embodiment, the first model MD1 is assumed to include twelve convolution layers CL0, CL1, CL2 ... CL11 in a sequential order. The convolution layer CL0 is configured to receive and process an input image IMGin to generate a convolution output tensor CT0. The convolution output tensor CT0 generated by the convolution layer CL0 is received by the following convolution layer CL1, and the convolution layer CL1 process the convolution output tensor CT0 to generate another convolution output tensor CT1. The convolution output tensor CT1 is received and processed by the following convolution layer CL2 to generate another convolution output tensor CT2. Similarly, the convolution output tensors CT3-CT11 are generated by the convolution layers CL3-CL11 in the sequential order. In an embodiment, the input image IMGin as shown in FIG. 2 can be provided by or included in the training data TD stored in the data storage 120.

In the embodiment shown in FIG. 2, the first model MD1 further includes two pooling layers PL1 and PL2, a fully-connected layer FCL and an activation function layer AFL. In some embodiments, the activation function layer AFL may include a Softmax function layer, but the disclosure is not limited thereto. In some other embodiments, the activation function layer AFL may include a Softmin function layer, a Softmax2d function layer, a LogSoftmax function layer or an Adaptive Softmax (e.g., AdaptiveLogSoftmaxWithLoss) function layer. The pooling layers PL1 and PL2 are utilized to down-sample the convolution output tensors generated by the convolution layers, such that the first model MD1 of the convolution neural network can integrate a local object feature into a high-level object feature. In this embodiment, each of the pooling layers PL1 and PL2 is configured to have a kernel size of 2×2 and a stride step equal to 2, but the disclosure is not limited thereto. In some other embodiments, the pooling layers can be configured to have a different kernel size and a different stride step. The fully-connected layer FCL and the activation function layer AFL are configured to link a result of the convolution output tensor CT11 to one specific label LAB, such that the first model MD1 is able to generate one label LAB corresponding to the input image IMGin.

In this embodiment, the first model MD1 includes the convolution layers CL0-CL11 with the channel widths in default amounts. For example, each of the convolution layers CL0-CL3 has 16 different convolution filters for matching image features (i.e., the channel widths of output channels=16); each of the convolution layers CL4-CL7 has 32 different convolution filters for matching image features (i.e., the channel widths of output channels=32); and, each of the convolution layers CL8-CL11 has 64 different convolution filters for matching image features (i.e., the channel widths of output channels=64). As shown in FIG. 2, in the convolution layers CL0-CL11, the convolution layers around a beginning end (e.g., the convolution layers CL0-CL3) adjacent to the input image IMGin has a lower channel width, and the convolution layers around a deeper end (e.g., the convolution layers CL8-CL11) adjacent to a fully-connected layer FC of the first model MD1 has a larger channel width.

Figure 3A:
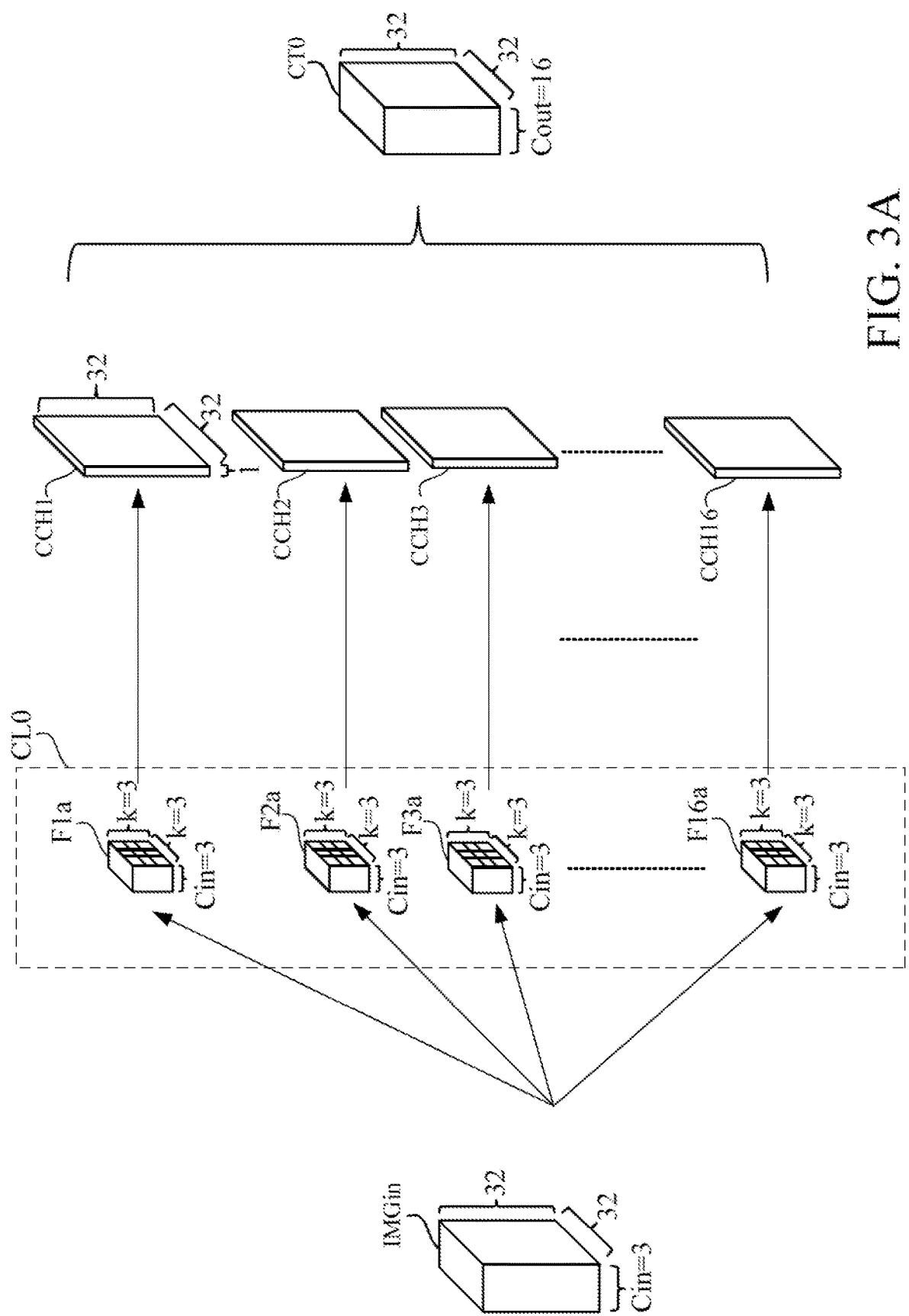
FIG. 3A is a schematic diagram illustrating a convolution layers shown in FIG. 2.

A model size of the first model MD1 is highly related to storage space required to store data in the convolution layers CL0-CL11. Reference is further made to FIG. 3A, which is a schematic diagram illustrating the convolution layers CL0 shown in FIG. 2.

As shown in FIG. 3A, the convolution layer CL0 (with the channel width equal to "16") includes sixteen convolution filters F1a-F16a. The convolution filter F1a is utilized to perform a convolution calculation with the input image IMGin to generate a convolution channel output CCH1. The convolution filter F2a is utilized to perform a convolution calculation with the input image IMGin to generate a convolution channel output CCH2. The convolution filter F3a is utilized to perform a convolution calculation with the input image IMGin to generate a convolution channel output CCH3. Similarly, the convolution filter F16a is utilized to perform a convolution calculation with the input image IMGin to generate a convolution channel output CCH16. These convolution channel outputs CCH1-CCH16 are integrated into the convolution output tensor CT0.

A storage size occupied by the convolution layer CL0 in the first model MD1 can be calculated as:

(a total amount of parameters) × (data bits of each parameter) = $(Cin \times k^2 \times Cout) \times DBits$ $$= (3 \times 3^2 \times 16) \times DBits$$

$$= 432 \times DBits.$$

In the equation above, Cin means an amount of input channels to the convolution layer CL0, k means a width/height of each convolution filter (F1a-F16a) in the convolution layer CL0, k is a positive integer ≥1, Cout means an amount of output channels from the convolution layer CL0, and DBits means how many data bits are carried in each pixel on one convolution filter.

It is noticed that the sizes of convolution filters F1a-F16a in the embodiment shown in FIG. 3A are assumed to be 3×3 for demonstration. However, the sizes of the convolution filters F1a-F16a are not limited to 3×3. In other embodiment, the convolution filters F1a-F16a can be replaced by 2×2, 2×3, 3×4, 4×4 or other size configurations. In order to simplify the demonstration, the convolution filters in other convolution layer CL1-CL11 are also assumed to be in size of 3×3, but the disclosure is not limited thereto.

Figure 3B:
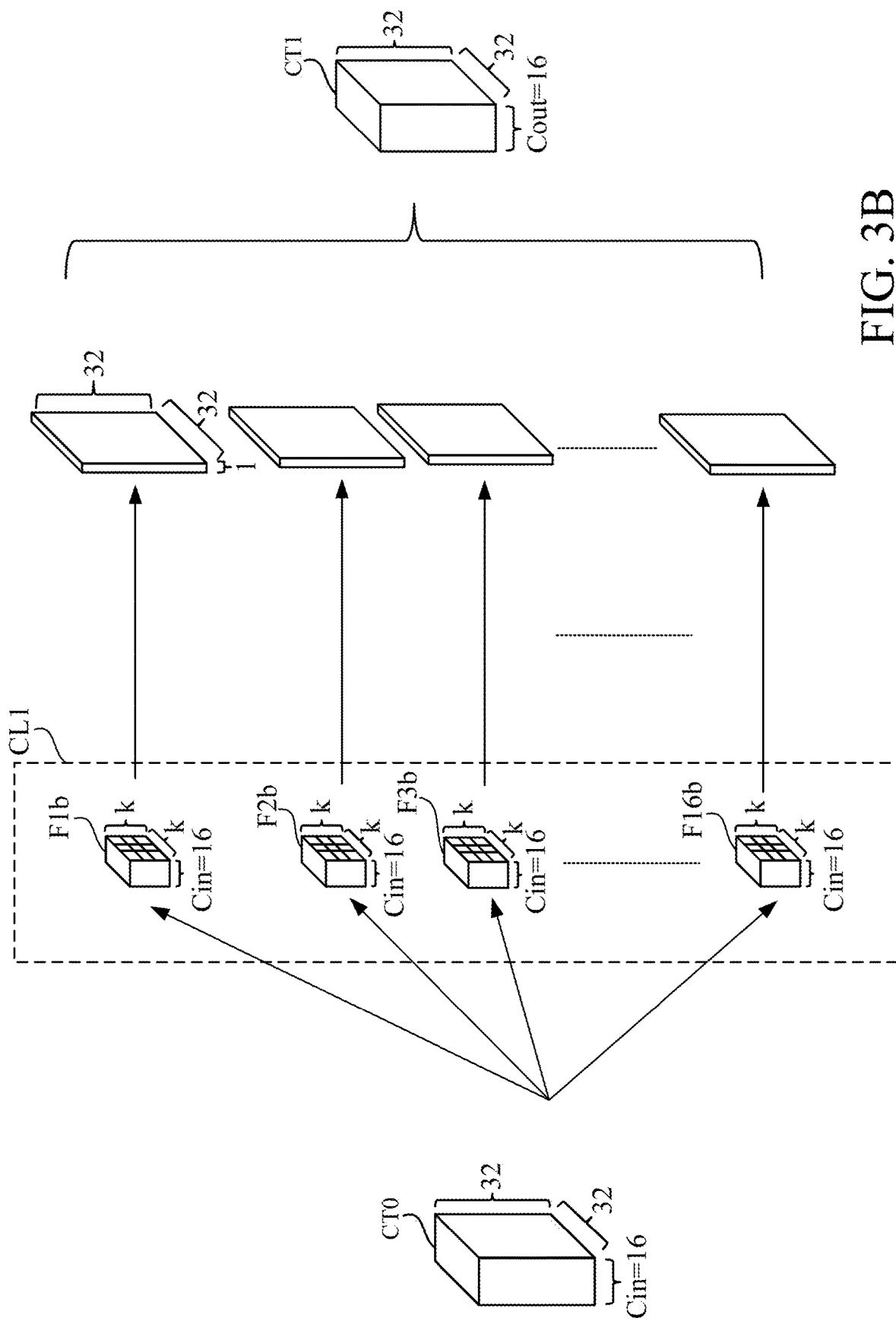
FIG. 3B is a schematic diagram illustrating another convolution layers shown in FIG. 2.

Reference is further made to FIG. 3B, which is a schematic diagram illustrating the convolution layers CL1 shown in FIG. 2. As shown in FIG. 3B, the convolution layer CL1 also includes sixteen convolution filters F1b-F16b. The convolution filters F1b-F16b are utilized to perform convolution calculation respectively on the convolution output tensor CT0 to generate a convolution output tensor CT1.

A storage size occupied by the convolution layer CL1 in the first model MD1 can be calculated as:

(a total amount of parameters) × (data bits of each parameter) = $(Cin \times k^2 \times Cout) \times DBits$ $$= (16 \times 3^2 \times 16) \times DBits$$

$$= 2304 \times DBits.$$

In the embodiment shown in FIG. 2, a storage size occupied by the convolution layer CL2 in the first model MD1 and another storage size occupied by the convolution layer CL3 in the first model MD1 are similar to the storage size occupied by the convolution layer CL1.

Figure 3C:
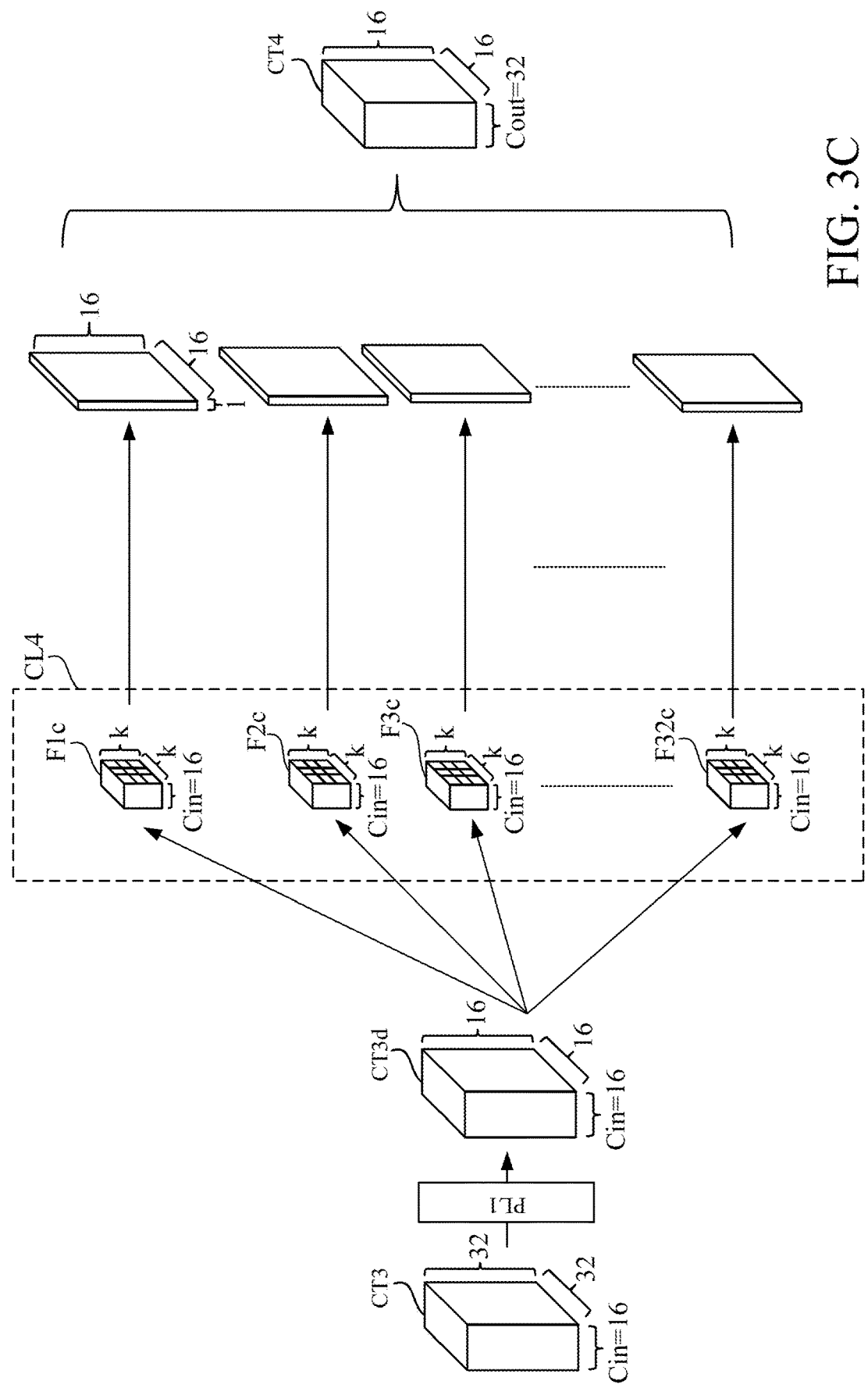
FIG. 3C is a schematic diagram illustrating another convolution layers shown in FIG. 2.

Reference is further made to FIG. 3C, which is a schematic diagram illustrating the convolution layers CL4 shown in FIG. 2. As shown in FIG. 3C, the convolution layer CL4 (with a channel width of input channels equal to "16" and another channel width of the output channels equal to "32") include thirty-two convolution filters F1c-F32c.

In this embodiment shown in FIG. 2 and FIG. 3C, a convolution output tensor CT3 generated by the convolution layer CL3 is down-sampled by the pooling layer PL1 of the first model MD1 into a sampled convolution output tensor CT3d. In this embodiment, the pooling layer PL1 is utilized to merge 2×2 feature points in the convolution output tensor CT3 into one feature point in the sampled convolution output tensor CT3d. In other words, the pooling layer PL1 in the embodiment has a stride step equal to "2", but the disclosure is not limited thereto. In this case, the sampled convolution output tensor CT3d will be in dimensions at height=16, width=16 and channel=16. In other words, the dimensions of the sampled convolution output tensor CT3d=16×16×16.

The convolution filters F1c-F32c are utilized to perform convolution calculation respectively on the sampled convolution output tensor CT3d to generate a convolution output tensor CT4.

A storage size occupied by the convolution layer CL4 in the first model MD1 can be calculated as:

(a total amount of parameters) × (data bits of each parameter) = $(Cin \times k^2 \times Cout) \times DBits$ $$= (16 \times 3^2 \times 32) \times DBits$$

$$= 4608 \times DBits.$$

Figure 3D:
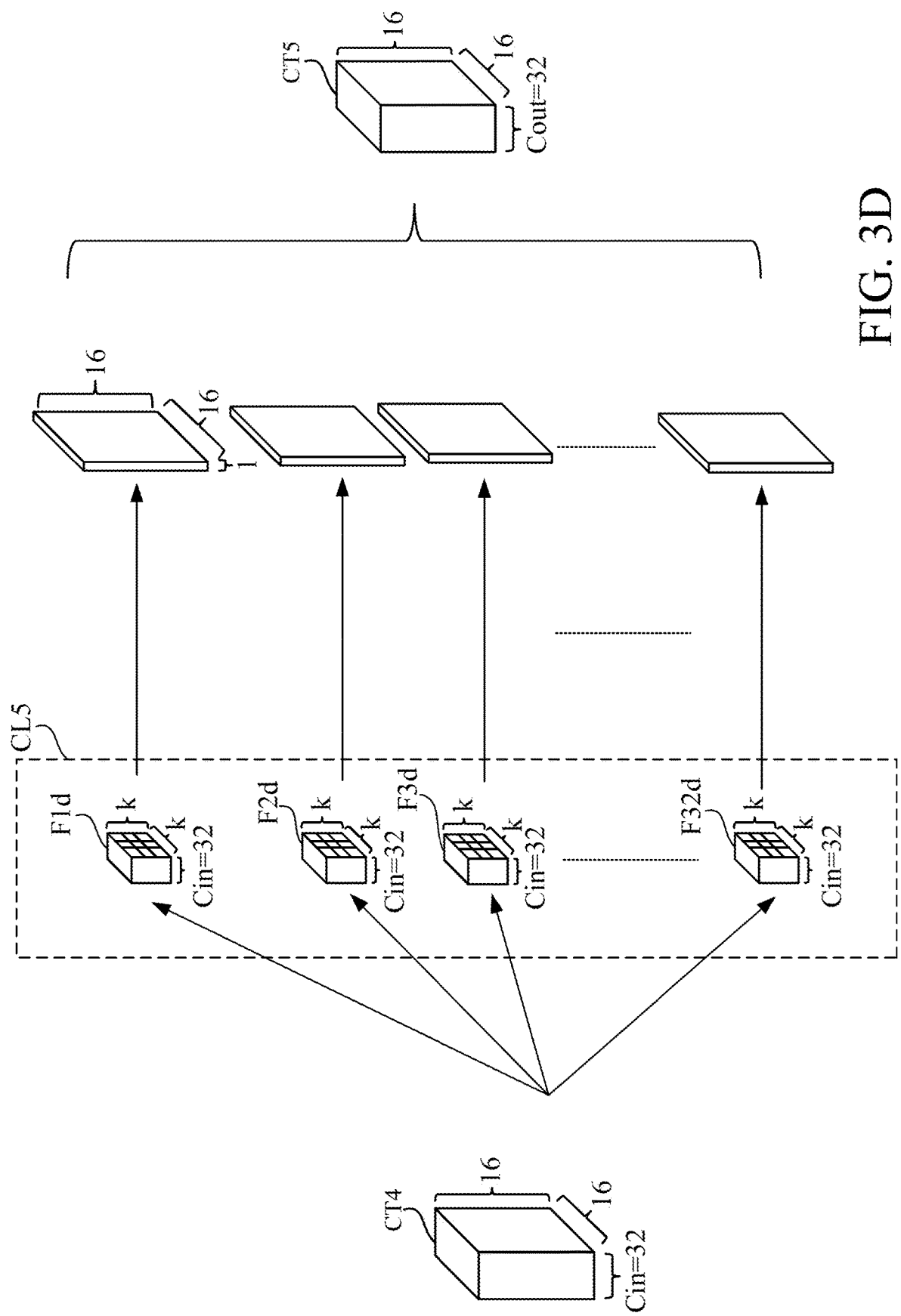
FIG. 3D is a schematic diagram illustrating another convolution layers shown in FIG. 2.

Reference is further made to FIG. 3D, which is a schematic diagram illustrating the convolution layers CL5 shown in FIG. 2. As shown in FIG. 3D, the convolution layer CL5 (with a channel width of input channels equal to "32" and another channel width of the output channels equal to "32") include thirty-two convolution filters F1d-F32d.

A storage size occupied by the convolution layer CL5 in the first model MD1 can be calculated as:

$$\text{(a total amount of parameters)} \times \text{(data bits of each parameter)} = (Cin \times k^2 \times Cout) \times DBits$$
$$= (32 \times 3^2 \times 32) \times DBits$$
$$= 9216 \times DBits.$$

In the embodiment shown in FIG. 2, a storage size occupied by the convolution layer CL6 in the first model MD1 and another storage size occupied by the convolution layer CL7 in the first model MD1 are similar to the storage size occupied by the convolution layer CL5.

Figure 3E:
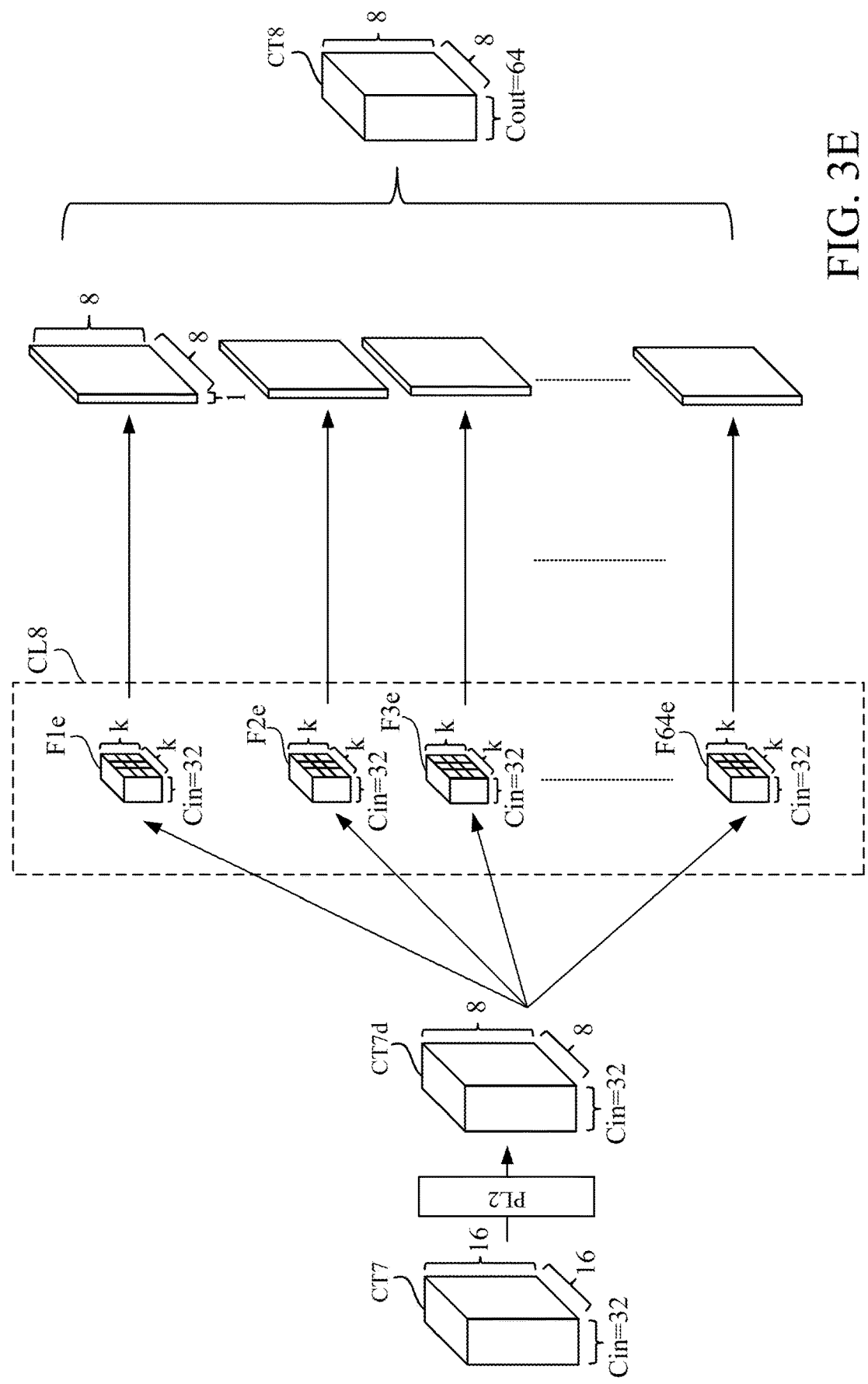
FIG. 3E is a schematic diagram illustrating another convolution layers shown in FIG. 2.

Reference is further made to FIG. 3E, which is a schematic diagram illustrating the convolution layers CL8 shown in FIG. 2. As shown in FIG. 3E, the convolution layer CL8 (a channel width of input channels equal to "32" and another channel width of the output channels equal to "64") include sixty-four convolution filters F1e-F64e.

A storage size occupied by the convolution layer CL8 in the first model MD1 can be calculated as:

$$\text{(a total amount of parameters)} \times \text{(data bits of each parameter)} = (Cin \times k^2 \times Cout) \times DBits$$
$$= (32 \times 3^2 \times 64) \times DBits$$
$$= 18432 \times DBits.$$

Figure 3F:
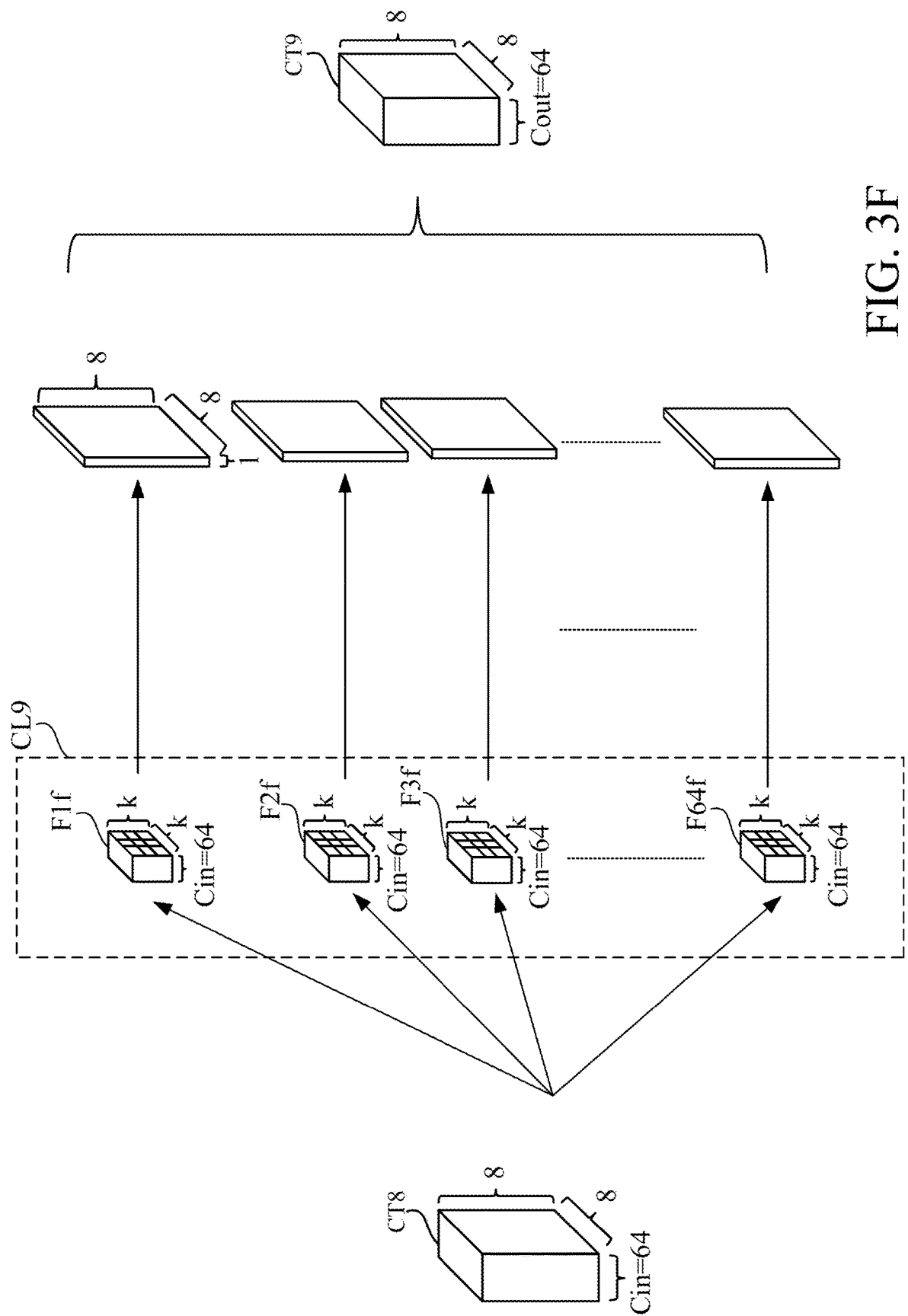
FIG. 3F is a schematic diagram illustrating another convolution layers shown in FIG. 2.

Reference is further made to FIG. 3F, which is a schematic diagram illustrating the convolution layers CL9 shown in FIG. 2. As shown in FIG. 3F, the convolution layer CL9 (with a channel width of input channels equal to "64" and another channel width of the output channels equal to "64") include sixty-four convolution filters F1f-F64f.

A storage size occupied by the convolution layer CL9 in the first model MD1 can be calculated as:

$$\text{(a total amount of parameters)} \times \text{(data bits of each parameter)} = (Cin \times k^2 \times Cout) \times DBits$$
$$= (64 \times 3^2 \times 64) \times DBits$$
$$= 36864 \times DBits.$$

In the embodiment shown in FIG. 2, a storage size occupied by the convolution layer CL10 in the first model MD1 and another storage size occupied by the convolution layer CL11 in the first model MD1 are similar to the storage size occupied by the convolution layer CL9.

An embodiment of the disclosure, the electronic apparatus 100 adjusts a structure of the convolution layers CL0-CL11 by reducing channel numbers of the convolution layers CL0-CL11, so as to reduce the model size of the first model MD1 of the convolutional neural network.

Based on that the convolution layers CL8-CL11 at the deeper end (adjacent to the fully-connected layer FCL) occupy more storage space compared to the convolution layers (e.g., CL0-CL3) adjacent to the beginning end (adjacent to the input image IMGin), the electronic apparatus 100 utilize an adjustment method to reduce in a backward order opposite to the sequential order. In other words, the electronic apparatus 100 and the adjustment method will reduce the channel numbers of the convolution layers (e.g., CL8-CL11) around the deeper end first before reducing the channel numbers of the convolution layers around the beginning end.

Figure 4:
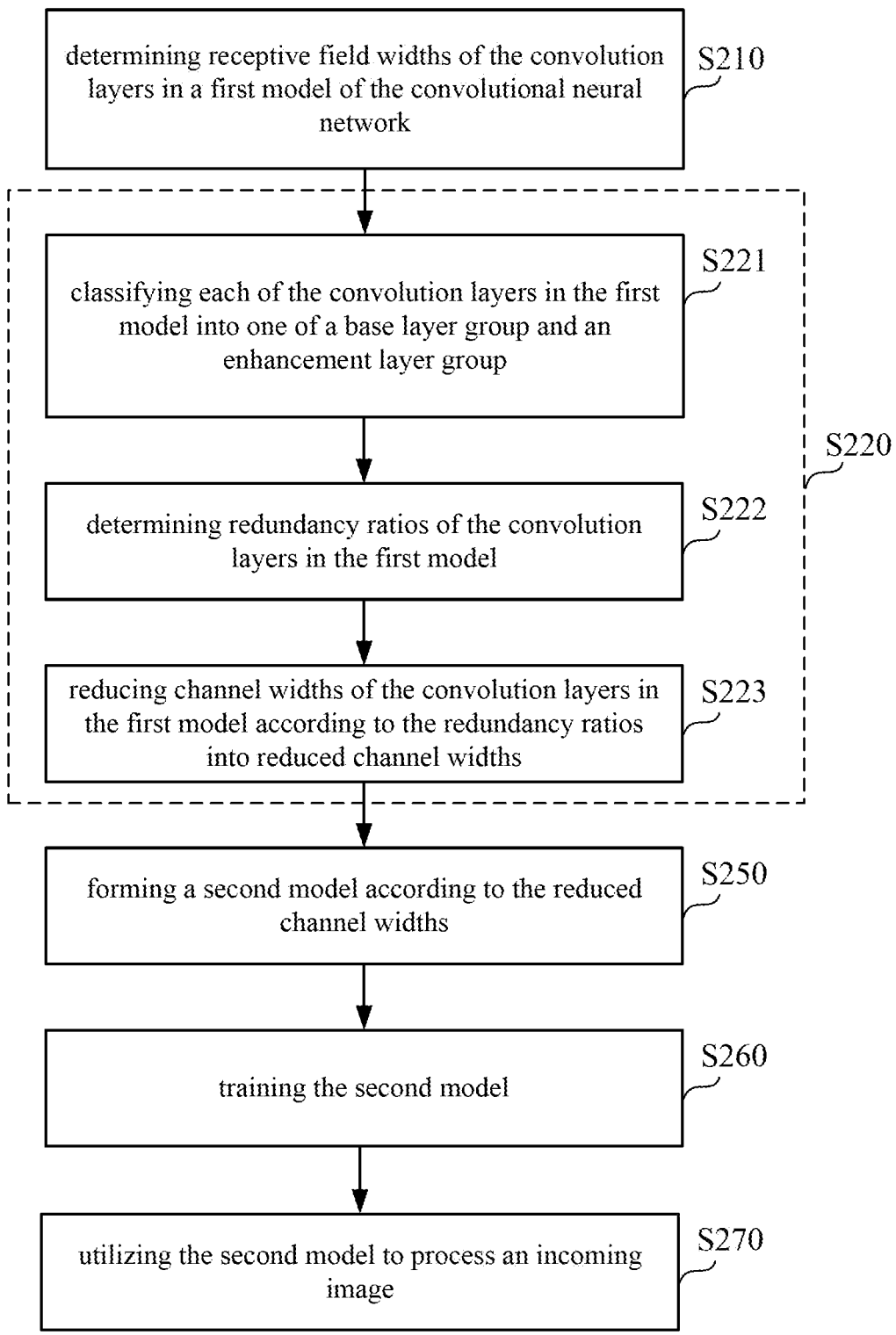
FIG. 4 is a schematic diagram illustrating a method for adjusting the convolutional neural network according to an embodiment of the disclosure.

Reference is further made to FIG. 4, which is a schematic diagram illustrating a method 200 for adjusting the convolutional neural network according to an embodiment of the disclosure. As shown in FIG. 1 and FIG. 4, the processor 140 of the electronic apparatus 100 is configured to execute the method 200 in FIG. 4 to determine how to adjust the structure of the first model MD1 of the convolutional neural network into a second model MD2 of the convolutional neural network. The electronic apparatus 100 utilizes the method 200 to effectively reduce a model size of the second model MD2 (compared to the first model MD1) and also to retain the preciseness of the object recognition performed by the second model MD2 of the convolutional neural network. Details about how to adjust the structure of the convolutional neural network are explained in following paragraphs.

As shown in FIG. 4, operation S210 of the method 200 is executed to determine receptive field widths of the convolution layers CL0-CL11 in the first model MD1 of the convolutional neural network. Each of the convolution layers CL0-CL11 may have a receptive field width different from another convolution layer. Reference is further made to FIG. 5A, which is a schematic diagram illustrating a receptive field width RFW0 corresponding to the convolution layer CL0 in FIG. 2 and another receptive field width RFW1 corresponding to the convolution layer CL1 in FIG. 2 according to an embodiment of the disclosure.

FIG. 5A shows a schematic view of one output channel layer of the convolution output tensor CT0 generated by the convolution layer CL0 and a schematic view of one output channel layer of the convolution output tensor CT1 generated by the convolution layer CL1 relative to the input image IMGin.

As shown in FIG. 5A, a feature point FP0 on the convolution output tensor CT0 is calculated by convolution between one 3×3 convolution filter and a projection region R0 on the input image IMGin. Therefore, the feature point FP0 on the convolution output tensor CT0 will be affected by the 3×3 projection region R0. In this case, the receptive field width RFW0 of the convolution layer CL0 is determined to be 3.

As shown in FIG. 5A, another feature point FP1 on the convolution output tensor CT1 is calculated by convolution between one 3×3 convolution filter and a projection region R1a on the convolution output tensor CT0. Because the convolution output tensor CT0 is calculated by convolution between one 3×3 convolution filter and the input image IMGin in advance. Therefore, the feature point FP1 on the convolution output tensor CT1 will be affected by the 5×5 projection region R1b on the input image IMGin. In this case, the receptive field width RFW1 of the convolution layer CL1 is determined to be 5.

Similarly, the receptive field width will be further accumulated in the following convolution layer CL2-CL11. A receptive field width of the convolution layer CL2 is determined to be 7. A receptive field width of the convolution layer CL3 is determined to be 9. After the pooling layer PL1 and another convolution calculation at the convolution layer CL4, a receptive field width of the convolution layer CL4 is determined to be 14. A receptive field width of the convolution layer CL5 is determined to be 18. A receptive field width of the convolution layer CL6 is determined to be 22. A receptive field width of the convolution layer CL7 is determined to be 26. After the pooling layer PL2 and another convolution calculation at the convolution layer CL8, a receptive field width of the convolution layer CL8 is determined to be 36. A receptive field width of the convolution layer CL9 is determined to be 44. A receptive field width of the convolution layer CL10 is determined to be 52. A receptive field width of the convolution layer CL11 is determined to be 60. The receptive field widths of the convolution layers CL0-CL11 determined in S210 are listed in the following TABLE 1.

TABLE 1

| conv. layer | CL0 | CL1 | CL2 | CL3 | CL4 | CL5 | CL6 | CL7 |
|---|---|---|---|---|---|---|---|---|
| channel width | 16 | 16 | 16 | 16 | 32 | 32 | 32 | 32 |
| R.F. width | 3 | 5 | 7 | 9 | 14 | 18 | 22 | 26 |
| classification | B | B | B | B | B | B | B | B |

| conv. layer | CL8 | CL9 | CL10 | CL11 |
|---|---|---|---|---|
| channel width | 64 | 64 | 64 | 64 |
| R.F. width | 36 | 44 | 52 | 60 |
| classification | B (or E) | E | E | E |

Figure 5B:
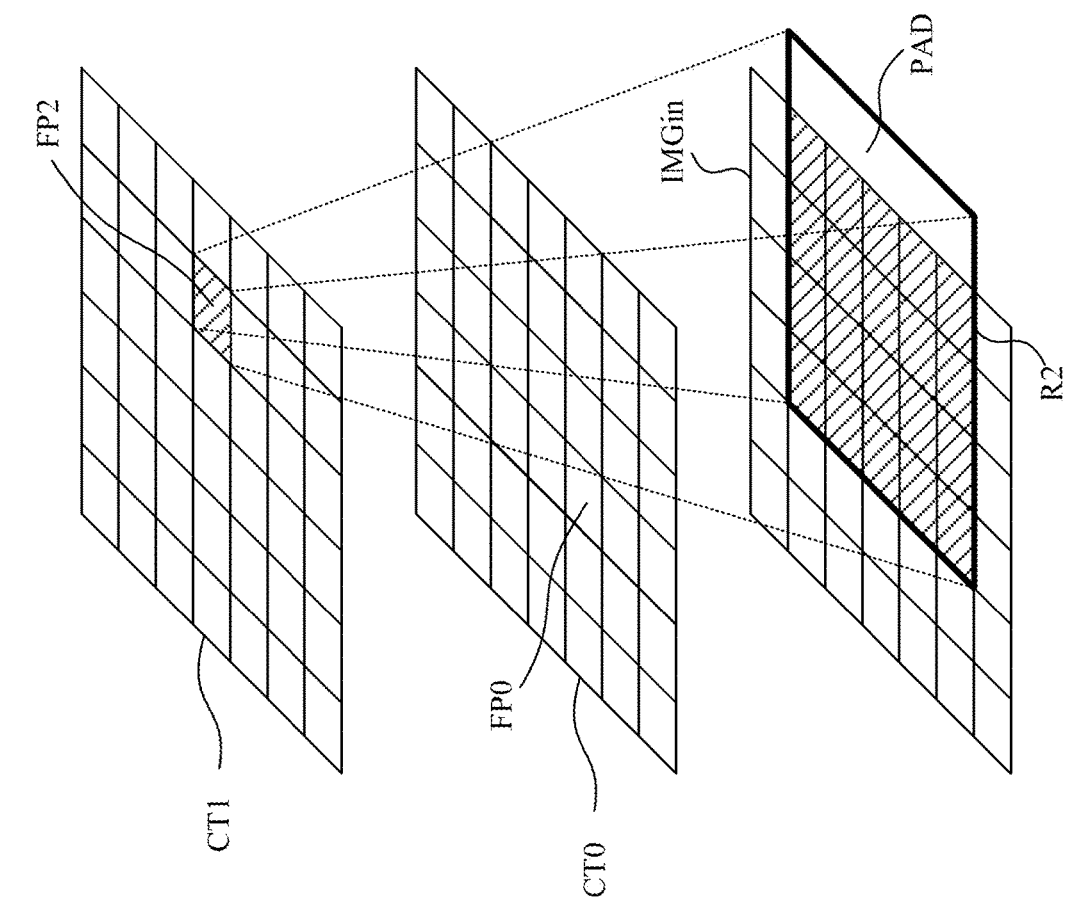
FIG. 5B is a schematic diagram illustrating a projection region on the input image corresponding to one feature point at the convolution output tensor according to an embodiment of the disclosure.
Figure 5A:
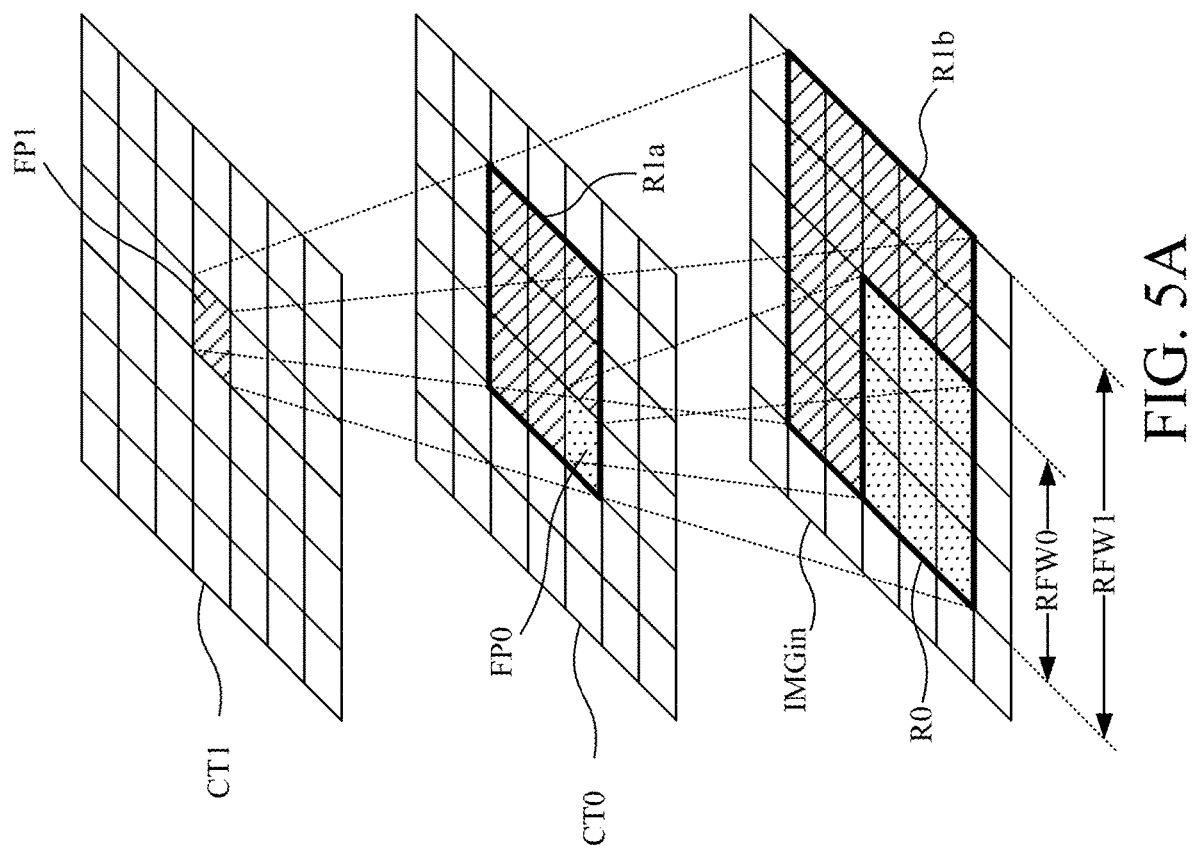
FIG. 5A is a schematic diagram illustrating a receptive field width corresponding to one convolution layer in FIG. 2 and another receptive field width corresponding to another convolution layer in FIG. 2 according to an embodiment of the disclosure.

Reference is further made to FIG. 5B, which is a schematic diagram illustrating a projection region R2 on the input image IMGin corresponding to one feature point FP2 at the convolution output tensor CT1 according to an embodiment of the disclosure. As shown in FIG. 5B, the feature point FP2 is affected by the projection region R2 on the input image IMGin. However, as shown in FIG. 5B, the projection region R2 exceeds a boundary of the input image IMGin. The area of the projection region R2 outside the boundary of the input image IMGin is called padding area PAD. The padding area PAD does not include real image data and is filled with inactive data, e.g., "0", for the convolution calculation. In this case, the feature point FP2 is calculated based on 80% of the real image data and 20% of the padding data.

A feature point calculated based on more padding data will be less effective in object recognition. A feature point calculated based on more real image data will be more effective in object recognition.

After operation S210 of determining receptive field widths of the convolution layers CL0-CL11, the method 200 performs operation S220 for reducing channel widths of the convolution layers in the first model MD1 into reduced channel widths according to aforesaid receptive field widths of the convolution layers CL0-CL11, by comparing the receptive field widths of the convolution layers CL0-CL11 with an input image width of the input image IMGin.

In an embodiment as shown in FIG. 4, the operation S220 includes operations S221, S222 and S223.

As shown in FIG. 4, operation S221 of the method 200 is executed to classify each of the convolution layers CL0-CL11 in the first model MD1 into one of a base layer group and an enhancement layer group by comparing the receptive field widths of the convolution layers CL0-CL11 in the first model MD1 with an input image width of the input image IMGin.

In the embodiment, the input image IMGin is assumed to be 32×32. In other words, the input image width of the input image IMGin is equal to 32.

The convolution layers CL0-CL11 are classified into the base layer group or the enhancement layer group by compared their receptive field widths (3, 5, 7, 9, 14, 18, 22, 26, 36, 44, 52 and 60) with the input image width "32". As shown in TABLE 1, the receptive field widths (3, 5, 7, 9, 14, 18, 22 and 26) of the convolution layers CL0-CL7 is lower than the input image width "32", and the receptive field widths (36, 44, 52 and 60) of the convolution layers CL8-CL11 is larger than the input image width "32".

In an embodiment as shown in TABLE 1, the convolution layers CL0-CL7 is classified into the base layer group because the receptive field widths (3, 5, 7, 9, 14, 18, 22 and 26) of the convolution layers CL0-CL7 are compared to be lower than the input image width "32", and the convolution layers CL9-CL11 is classified into the enhancement layer group because the receptive field widths (44, 52 and 60) of the convolution layers CL9-CL11 are compared to be larger than the input image width "32". It is noticed that the receptive field width (36 in this embodiment) of the convolution layer CL8 which is the first layer to exceed the input image width (32 in this embodiment) is still classified into the base layer group in this embodiment as shown in TABLE 1. However, this disclosure is not limited thereto.

In another embodiment, the convolution layers CL0-CL7 (with receptive field widths lower than the input image width) are classified into the base layer group, and the convolution layers CL8-CL11 (with receptive field widths exceeding the input image width) are classified into the enhancement layer group.

In the embodiment illustrated in TABLE 1, the input image width "32" is utilized to a threshold for the receptive field size of convolution layers to classify the base layer group and the enhancement layer group. In this case, the input image width is equal to the threshold for the receptive field size of convolution layers. However, the disclosure is not limited thereto.

In another embodiment, a threshold to classify the base layer group and the enhancement layer group can be configured at (X %*the input image width). In other words, the threshold is positively related to the input image width.

In an embodiment, X is a number between 0 and 100, but the disclosure is not limited thereto. In another embodiment, when the electronic apparatus 100 and the method 200 tend to elevate a prediction accuracy of the convolutional neural network to be trained, the X can be a number between 0 and 200. X affects a compression ratio in the method 200. When X is configured to be lower, more convolution layers will be classified into the enhancement layer group, and fewer convolution layers will be classified into the base layer group, such that channel widths on more convolution layers will be reduced (in following operation S223). When X is configured to be higher, more convolution layers will be classified into the base layer group, and fewer convolution layers will be classified into the enhancement layer group, such that channel widths on fewer convolution layers will be reduced (in following operation S223).

In general, the convolution layers closer to the deeper end tend to be classified into the enhancement layer group, and the convolution layers closer to the beginning end tends to be classified into the base layer group.

As shown in FIG. 4, operation S222 of the method 200 is executed to determine redundancy ratios of the convolution layers CL0-CL11 in the first model MD1 according to a partial calculation amount of the enhancement layer group relative to a total calculation amount of the base layer group and the enhancement layer group.

Some details related to how to calculate the redundancy ratios of the convolution layers CL0-CL11 in S222 are listed in the following TABLE 2.

TABLE 2

| conv. layer | CL0 | CL1 | CL2 | CL3 | CL4 | CL5 | CL6 | CL7 |
|---|---|---|---|---|---|---|---|---|
| classification | B | B | B | B | B | B | B | B |
| flop counts | FC0 | FC1 | FC2 | FC3 | FC4 | FC5 | FC6 | FC7 |
| Eff. Prob. | 35% | 52% | 40% | 36% | 42% | 56% | 48% | 51% |
| Eff. flop cnts | EFC0 | EFC1 | EFC2 | EFC3 | EFC4 | EFC5 | EFC6 | EFC7 |
| redundancy ratio | 0 | 0 | 0 | 0 | 0 | 0 | 0 | 0 |

| conv. layer | CL8 | CL9 | CL10 | CL11 |
|---|---|---|---|---|
| classification | B | E | E | E |
| flop counts | FC8 | FC9 | FC10 | FC11 |
| Eff. Prob. | 39% | 41% | 57% | 52% |
| Eff. flop cnts | EFC8 | EFC9 | EFC10 | EFC11 |
| redundancy ratio | 0 | 0.13 | 0.28 | 0.4 |

Firstly, flop counts in convolution calculation at every convolution layers CL0-CL11 are known and fixed number. A flop count FC0 at the convolution layers CL0 is decided by how many times of multiplication and adding are required at the convolution layer CL0 to generate the convolution output tensor CT0. A flop count FC1 at the convolution layers CL1 is decided by how many times of multiplication and adding are required at the convolution layer CL1 to generate the convolution output tensor CT1. Similar, flop counts FC2-FC11 are decided by how many times of multiplication and adding are required at the convolution layers CL2-CL11 to generate the convolution output tensors CT2-CT11.

In an embodiment, the first model MD1 of the convolutional neural network further includes twelve activation layers (not shown in figures). Each of the activation layers are arranged after one of the convolution layers CL0-CL11. In one embodiment, the activation layers can be rectified linear units (ReLU). The rectified linear units are used to replace negative data into "0" and remain all positive data in the convolution output tensor CT0-CT11 generated by each of the convolution layers CL0-CL11. In this embodiment, a convolution output tensor generated by each of the convolution layers is rectified by one of the activation layers into non-zero outputs and zero outputs. However, the activation layers are not limited to the rectified linear units (ReLU). In some embodiments, the activation layers may be selected from at least one or a combination of ELU, Sigmoid, Softplus, Tanh, or any equivalent activation layer. In operation S222, the processor 140 calculates an effective probability respectively for each of the convolution layers CL0-CL11 according to a ratio of the non-zero outputs among all outputs in the convolution output tensor CT0-CT11. It is assumed that there are 35% non-zero outputs among all outputs in the convolution output tensor CT0. In this case, an effective flop count EFC0 for the convolution layers CL0 is calculated by a product between the original flop counts FC0 and the effective probability "35%". In other words, the effective flop count EFC0=FC0*35%.

It is assumed that there are 52%, 40% 36%, 42%, 56%, 48%, 51%, 39%, 41%, 57% and 52% non-zero outputs among all outputs in the convolution output tensor CT1, CT2, CT3, CT4, CT5, CT6, CT7, CT8, CT9, CT10 and CT11. The effective flop count EFC1 of the convolution layers CL1 is calculated by a product between the original flop counts FC1 and the corresponding effective probability "52%", and the effective flop count EFC2 of the convolution layers CL2 is calculated by a product between the original flop counts FC2 and the corresponding effective probability "40%".

Based on aforesaid effective flop counts EFC0-EFC8 of the convolution layers CL0-CL8 in the base layer group and the effective flop counts EFC9-EFC11 of the convolution layers CL9-CL11 in the enhancement layer group, the processor 140 execute operation S222 to determine the redundancy ratios of the convolution layers CL0-CL11 in the first model MD1.

Firstly, a redundancy ratio of the convolution layer CL11 is determined according to a partial calculation amount of the enhancement layer group relative to a total calculation amount, as:

(EFC9+EFC10+EFC11)/(EFC0+EFC1+EFC2 . . . EFC10+EFC11).

In other words, a redundancy ratio of the convolution layer CL11 is determined by the sum of the effective flop counts (EFC9-EFC11) in the enhancement layer group divided by a sum of the effective flop counts in all convolution layer CL0-CL11. As shown in TABLE 2, the redundancy ratio of the convolution layer CL11 is determined to be "0.4".

Secondly, a redundancy ratio of the convolution layer CL10, according to a partial calculation amount of the enhancement layer group relative to a total calculation amount, as:

(EFC9+EFC10)/(EFC0+EFC1+EFC2 . . . EFC9+EFC10).

In other words, a redundancy ratio of the convolution layer CL10 is determined by the sum of the effective flop counts (EFC9 and EFC10) in the enhancement layer group of the convolution layers until the convolution layer CL10 itself divided by a sum of the effective flop counts in all convolution layer CL0-CL10 from the first one of the convolution layers until the convolution layer CL10 itself. As shown in TABLE 2, the redundancy ratio of the convolution layer CL10 is determined to be "0.28".

Thirdly, a redundancy ratio of the convolution layer CL9 is determined, according to a partial calculation amount of the enhancement layer group relative to a total calculation amount, as:

(EFC9)/(EFC0+EFC1+EFC2 ... EFC8+EFC9).

In other words, a redundancy ratio of the convolution layer CL9 is determined by the effective flop count EFC9 in the enhancement layer group of the convolution layers until the convolution layer CL9 divided by a sum of the effective flop counts in all convolution layer CL0-CL9 from the first one of the convolution layers until the convolution layer CL9 itself. As shown in TABLE 2, the redundancy ratio of the convolution layer CL9 is determined to be "0.13".

Afterward, the redundancy ratios of the convolution layers CL0-CL8 are determined to be zero, because there is no convolution layer classified into the enhancement layer group from CL0 to CL8.

As shown in FIG. 4, operation S223 of the method 200 is executed to reduce channel widths of the convolution layers CL0-CL11 in the first model MD1 according to the redundancy ratios into reduced channel widths.

Some details related to how to calculate the reduced channel widths of the convolution layers CL0-CL11 in S223 are listed in the following TABLE 3.

TABLE 3

| conv. layer | CL0 | CL1 | CL2 | CL3 | CL4 | CL5 | CL6 | CL7 |
|---|---|---|---|---|---|---|---|---|
| channel width | 16 | 16 | 16 | 16 | 32 | 32 | 32 | 32 |
| redundancy ratio | 0 | 0 | 0 | 0 | 0 | 0 | 0 | 0 |
| reduced channel width | 16 | 16 | 16 | 16 | 32 | 32 | 32 | 32 |

| conv. layer | CL8 | CL9 | CL10 | CL11 |
|---|---|---|---|---|
| channel width | 64 | 64 | 64 | 64 |
| redundancy ratio | 0 | 0.13 | 0.28 | 0.4 |
| reduced channel width | 64 | 57 | 50 | 46 |

In operation S223, the processor 140 is configured to calculate the reduced channel widths of the convolution layers CL0-CL11 according to original channel widths in the first model MD1 and the corresponding redundancy ratios of the convolution layers CL0-CL11.

In the embodiment shown in TABLE 3, a reduced channel width of the convolution layers CL11 is calculated by:

$$\text{(original channel width of } CL11)/(1 + \text{redundancy ratio of } CL11) = 64/1.4$$
$$= 46.$$

In the embodiment shown in TABLE 3, a reduced channel width of the convolution layers CL10 is calculated by:

$$\text{(original channel width of } CL10)/(1 + \text{redundancy ratio of } CL10) = 64/1.28$$
$$= 50.$$

In the embodiment shown in TABLE 3, a reduced channel width of the convolution layers CL9 is calculated by:

$$\text{(original channel width of } CL9)/(1 + \text{redundancy ratio of } CL9) = 64/1.13$$
$$= 56.637 \approx 57.$$

In the embodiment shown in TABLE 3, the channel widths of the convolution layers CL0-CL8 are not reduced because their redundancy ratios are determined to be zero.

In aforesaid embodiment, a channel width of a $M^{th}$ convolution layer of the first model is reduced to a lower channel width compared to another channel width of a $(M-1)^{th}$ convolution layer of the first model. M is a positive integer. For example, the reduced channel width of convolution layer CL11 is configured to be "46", which is lower than the reduce channel width "50" of convolution layer CL10.

In other words, the channel width in the $M^{th}$ convolution layer is reduced with a higher proportion compared to the channel width in the $(M-1)^{th}$ convolution layer. For example, the channel width of convolution layer CL11 is reduced by 28.125% from 64 to 46; the channel width of convolution layer CL10 is reduced by 21.875% from 64 to 50; and, the channel width of convolution layer CL9 is reduced by 10.9375% from 64 to 57. The channel width of convolution layer CL11 is reduced with a higher proportion (28.125%) compared to the convolution layer CL10 (reduced by 21.875%). Similarly, the channel width of convolution layer CL10 is reduced with a higher proportion (21.875%) compared to the convolution layer CL9 (reduced by 10.9375%).

In aforesaid embodiment of the electronic apparatus 100 and the method 200, a channel width of the convolution layer closer to the deeper end will be reduced more than another channel width of the convolution layer closer to the beginning end. The convolution layer (e.g., CL9-CL11) closer to the deeper end will have a larger receptive field width, such that the corresponding convolution output tensors (CT9-CT11) will include a larger portion of outputs affected by padding data (referring to the padding area PAD shown in FIG. 5B). Therefore, reducing the convolution filters on the convolution layer (e.g., CL9-CL11) closer to the deeper end will induce minor influence to the preciseness of the object recognition compared to reducing the convolution filters on the convolution layer (e.g., CL0-CL3) closer to the beginning end. On the other hand, because convolution filters on the convolution layer (e.g., CL9-CL11) closer to the deeper end occupy more storage space, reducing the convolution filters on the convolution layer (e.g., CL9-CL11) closer to the deeper end will help to reduce the model size of the convolution neutral network.

Figure 6:
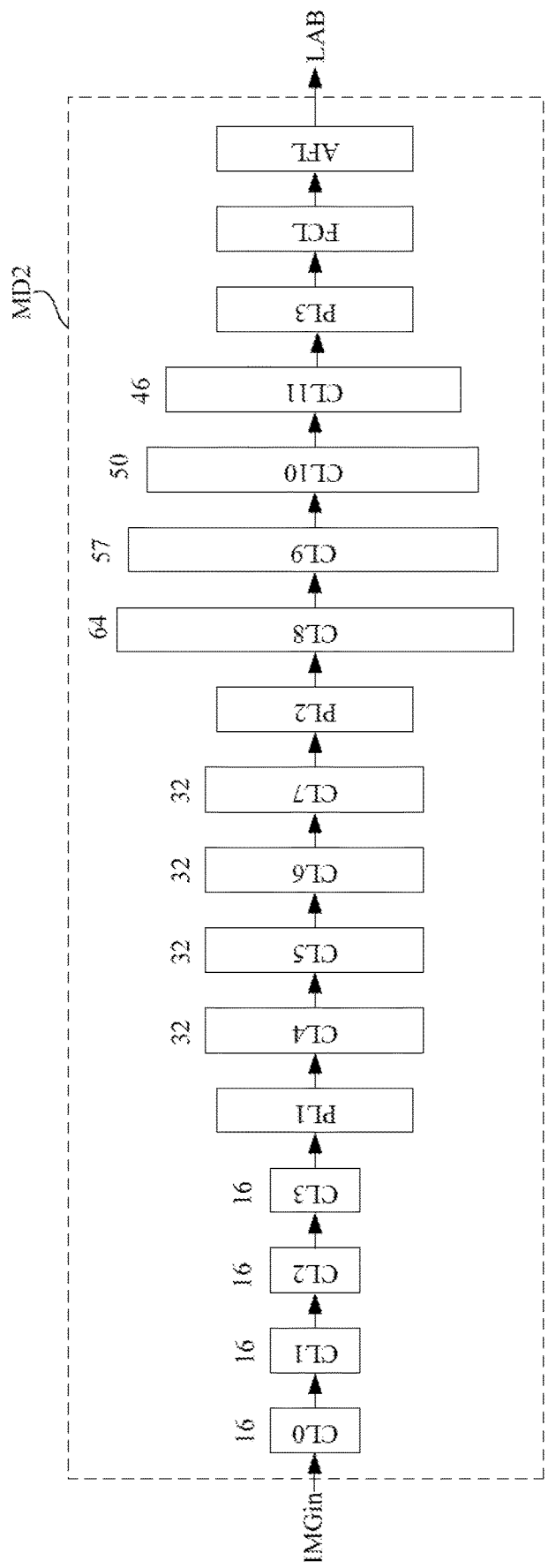
FIG. 6 is a schematic diagram illustrating the structure of the second model of the convolutional neural network with the reduced channel widths according to the embodiment.

In operation S250, the processor 140 is configured to form a structure of the second model MD2 of the convolutional neural network according to the reduced channel widths calculated in S223 as shown in TABLE 3. Reference is further made to FIG. 6, which is a schematic diagram illustrating the structure of the second model MD2 of the convolutional neural network with the reduced channel widths according to the embodiment shown in TABLE 3. As shown in FIG. 6, the second model MD2 includes twelve convolution layers CL0, CL1, CL2 . . . CL11 in a sequential order. It is noticed that the channel widths of the convolution layers CL9-CL11 are now reduced to 57, 50 and 46 in the second model MD2.

In operation S260, the processor 140 is configured to train the second model MD2 of the convolutional neural network according to the training data TD stored in the stored in the data storage 120. A model size of the second model MD2 will be smaller than the model size of the first model MD1 because the reduced channel widths at the convolution layers CL9-CL11.

In operation S270, the second model MD2 of the convolutional neural network can be utilized by the processor 140 to process an incoming image IMGnew. In an embodiment, the second model MD2 can be used by the processor 140 to recognize an incoming image IMGnew and generate a label IMGlab corresponding to the incoming image IMGnew as shown in FIG. 1.

However, the second model MD2 is not limited to generate the label IMGlab corresponding to the incoming image IMGnew. In another embodiment, the second model MD2 can be used by the processor 140 to detect an object (e.g., a human, a face, an animal, a vehicle or a building) within the incoming image IMGnew. In still another embodiment, the second model MD2 can be used by the processor 140 to segment a foreground object (e.g., a human, a face, an animal, a vehicle or a building) from a background (e.g., a mountain view, a street view or an indoor decoration) of the incoming image IMGnew.

In aforesaid embodiments, the redundancy ratios in operation S222 and the reduced channel widths in operation S223 are determined respectively on each one of the convolution layers CL0-CL11. However, the disclosure is not limited thereto. In another embodiment, the convolution layers CL0-CL11 can be grouped into several macroblocks and one redundancy ratio is determined to one of the macroblocks, so as to speed up and simplify the computation of the redundancy ratios and the reduced channel widths.

Figure 7:
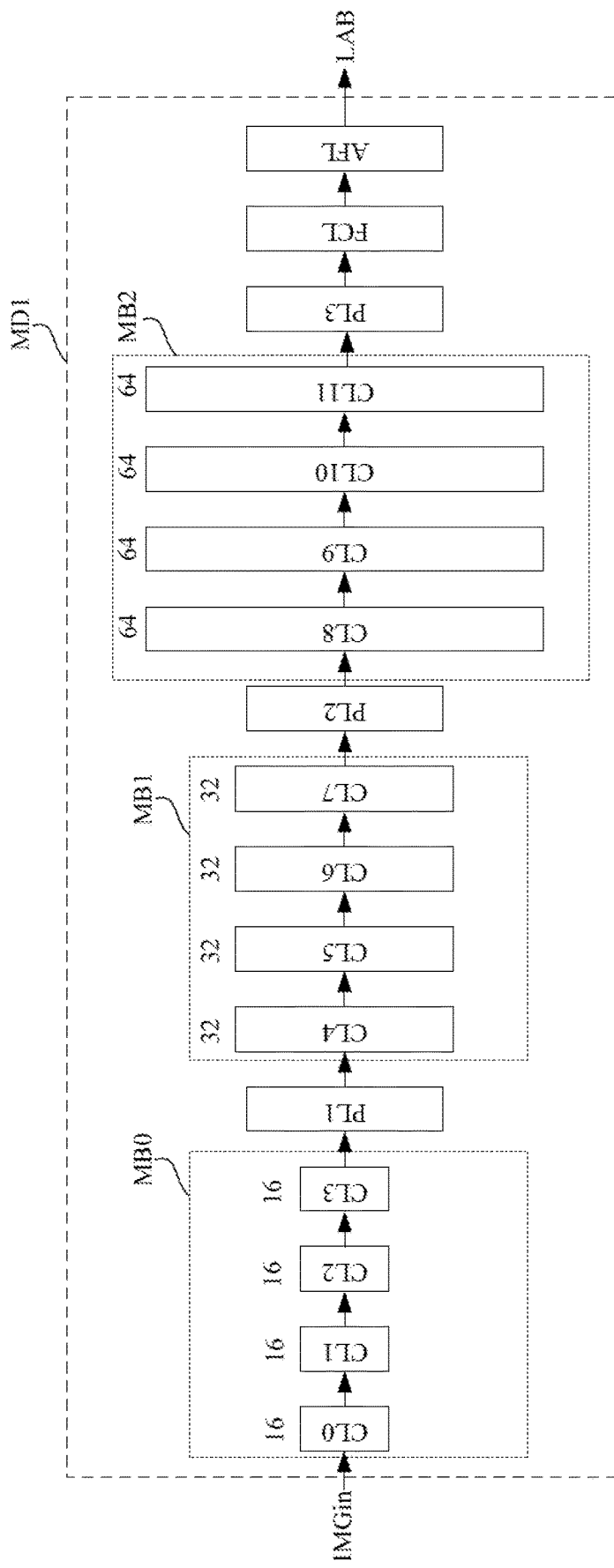
FIG. 7 is a schematic diagram illustrating a first model with macroblocks according to an embodiment.
Figure 8:
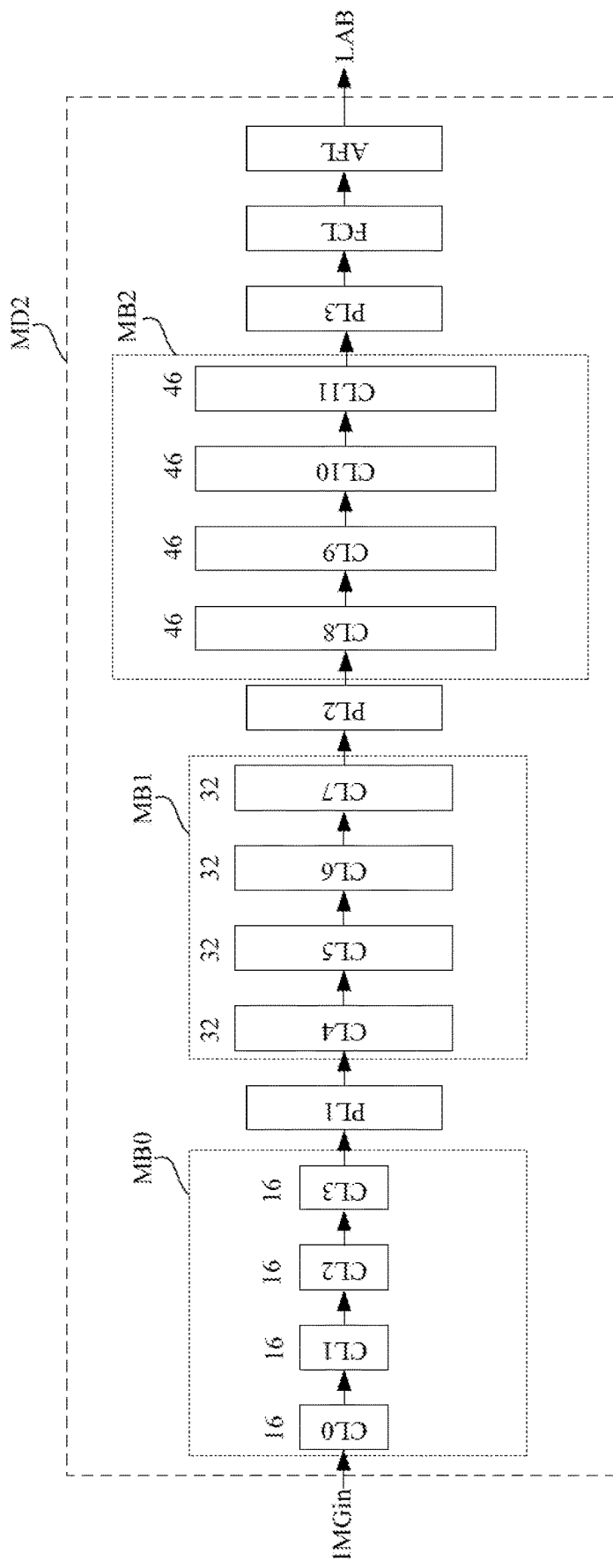
FIG. 8 is a schematic diagram illustrating a second model with macroblocks according to an embodiment.

Reference is further made to FIG. 7, FIG. 8 and following TABLE 4. FIG. 7 is a schematic diagram illustrating a first model MD1 with macroblocks MB0-MB2 according to an embodiment. FIG. 8 is a schematic diagram illustrating a second model MD2 with macroblocks MB0-MB2 according to an embodiment. TABLE 4 shows some details in an embodiment related to how to calculate the reduced channel widths of the macroblocks MB0-MB2.

As shown in FIG. 7, the first model MD1 of the convolutional neural network includes convolution layers CL0-CL3, a pooling layer PL1, convolution layers CL4-CL7, another pooling layer PL2 and convolution layers CL8-CL11 arranged in the sequential order. The convolution layers CL0-CL3 are grouped into a macroblock MB0. The convolution layers CL4-CL7 are grouped into another macroblock MB1. The convolution layers CL8-CL11 are grouped into another macroblock MB2.

In this embodiment, operation S223 in FIG. 4 will reduce channel widths of the convolution layers in a macroblock if any one of the convolution layers in the macroblock is in the enhancement layer group.

Based the embodiments shown in TABLE 4, the convolution layers CL0-CL3 in the macroblock MB0 are all in the base layer group. The convolution layers CL4-CL7 in the macroblock MB1 are all in the base layer group. The channel widths of the macroblock MB0 and the macroblock MB1 will not be reduced.

The convolution layers CL9-CL11 in the macroblock MB2 are in the enhancement layer group. There, the channel widths of the macroblock MB2 will be reduced to "46". Details about how to calculate the reduced channel widths of the macroblock MB2 can be referred to calculation of the reduced channel widths of the convolution layer CL11 in the embodiment of TABLE 3.

TABLE 4

| conv. layer | CL0 | CL1 | CL2 | CL3 | CL4 | CL5 | CL6 | CL7 |
|---|---|---|---|---|---|---|---|---|
| macro block classification | B | MB0 B | B | B | B | MB1 B | B | B |
| redundancy ratio | | | 0 | | | | 0 | |
| reduced channel width | | | 16 | | | | 32 | |

| conv. layer | CL8 | CL9 | CL10 | CL11 |
|---|---|---|---|---|
| macro block classification | B | E | MB2 E | E |
| redundancy ratio | | | 0.4 | |
| reduced channel width | | | 46 | |

Figure 9:
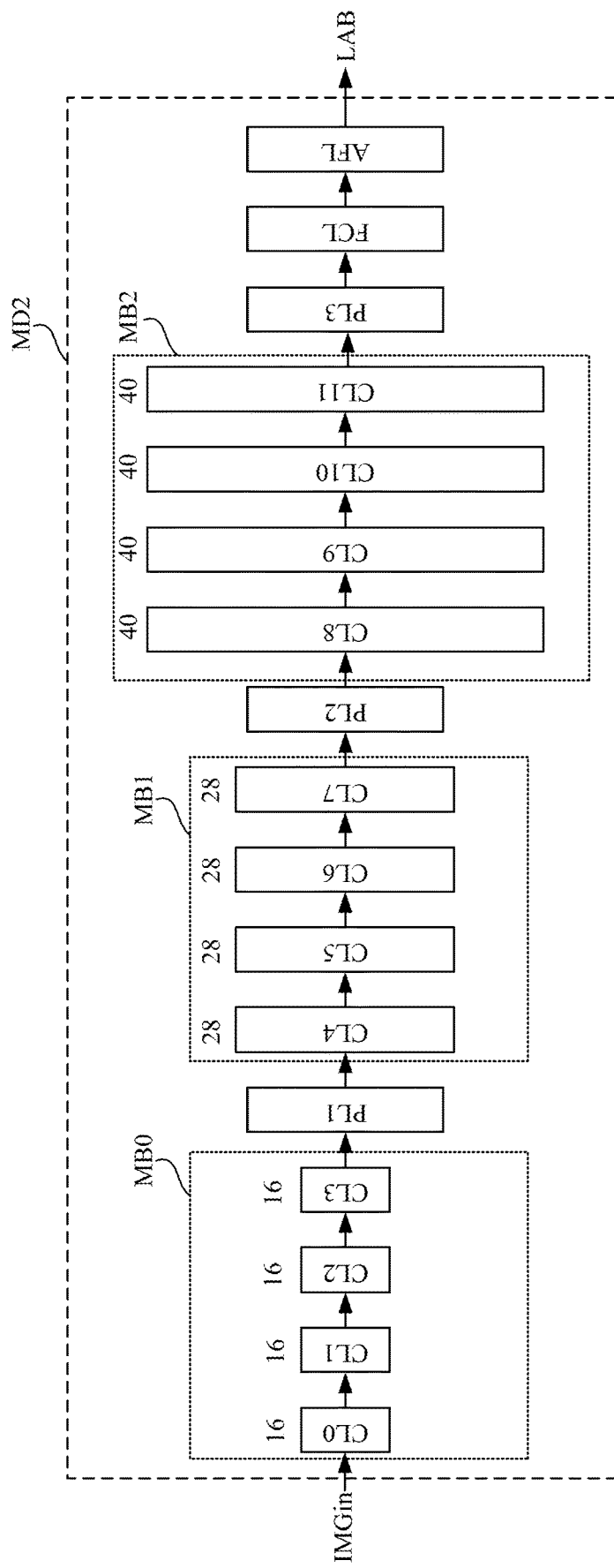
FIG. 9 is a schematic diagram illustrating a second model with macroblocks according to another embodiment.

Reference is further made to FIG. 9 and following TABLE 5. FIG. 9 is a schematic diagram illustrating a second model MD2 with macroblocks MB0-MB2 according to another embodiment. TABLE 5 shows some details in an embodiment related to how to calculate the reduced channel widths of the macroblocks MB0-MB2 in FIG. 9.

In the embodiment shown in TABLE 5, it is assumed that the convolution layers CL6-CL7 in the macroblock MB1 are classified in the enhancement layer group, and the convolution layers CL8-CL11 in the macroblock MB2 are classified in the enhancement layer group. In addition, in the embodiment shown in TABLE 5, it is assumed that the convolution layers CL0-CL3 in the macroblock MB0 are classified in the base layer group, and the convolution layers CL4-CL5 in the macroblock MB1 are classified in the base layer group.

TABLE 5

| conv. layer | CL0 | CL1 | CL2 | CL3 | CL4 | CL5 | CL6 | CL7 |
|---|---|---|---|---|---|---|---|---|
| macro block classification | B | MB0 B | B | B | B | MB1 B | E | E |
| redundancy ratio | | | 0 | | | | 0.15 | |
| reduced channel width | | | 16 | | | | 28 | |

TABLE 5-continued

| conv. layer | CL8 | CL9 | CL10 | CL11 |
|---|---|---|---|---|
| macro block classification | E | MB2 E | E | E |
| redundancy ratio |  |  | 0.6 |  |
| reduced channel width |  |  | 40 |  |

In the embodiment shown in TABLE 5 and FIG. 9, when the channel widths in the macroblock MB2 and the channel widths in the macroblock MB1 are both reduced, the channel widths in the macroblock MB2 are reduced with a higher proportion compared to the channel widths in the macroblock MB1. In the embodiment shown in TABLE 5, the channel widths in the macroblock MB2 is reduced by 37.5% and the channel widths in the macroblock MB1 is reduced by 12.5%.

In aforesaid embodiment of the electronic apparatus 100 and the method 200, channel widths of the macroblock closer to the deeper end will be reduced more than channel widths of the macroblock closer to the beginning end. Therefore, reducing the convolution filters on the convolution layer in the macroblock closer to the deeper end will induce minor influence to the preciseness of the object recognition. On the other hand, reducing the convolution filters on the convolution layer of the macroblock closer to the deeper end will help to reduce the model size of the convolution neutral network.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for adjusting a convolutional neural network, a first model of the convolutional neural network comprising a plurality of convolution layers in a sequential order, the adjustment method comprising:
   determining a plurality of receptive field widths of the convolution layers in the first model of the convolutional neural network, wherein the receptive field widths of the convolution layers are determined by calculating widths of projective regions on an input image affecting one feature point in convolution output tensors of the convolution layers;
   reducing a plurality of channel widths of the convolution layers in the first model into a plurality of reduced channel widths according to the receptive field widths of the convolution layers and an input image width;
   forming a structure of a second model of the convolutional neural network according to the reduced channel widths; and
   training the second model of the convolutional neural network.

2. The method of claim 1, wherein reducing the channel widths of the convolution layers in the first model comprises:
   classifying each of the convolution layers in the first model into one of a base layer group and an enhancement layer group by comparing the receptive field widths of the convolution layers in the first model with a threshold positively related to the input image width;
   determining a plurality of redundancy ratios of the convolution layers in the first model according to a partial calculation amount of the enhancement layer group relative to a total calculation amount of the base layer group and the enhancement layer group; and
   reducing the channel widths of the convolution layers in the first model into the reduced channel widths according to the redundancy ratios of the convolution layers.

3. The method of claim 2, wherein classifying each of the convolution layers comprises:
   in response to a first one of the convolution layers has a receptive field width lower than the threshold positively related to the input image width, classifying the first one of the convolution layers in the first model into one of the base layer group; and
   in response to a second one of the convolution layers has a receptive field width exceeding the threshold positively related to the input image width, classifying the second one of the convolution layers in the first model into one of the enhancement layer group.

4. The method of claim 2, wherein the convolutional neural network further comprises a plurality of activation layers, each of the activation layers are arranged after one of the convolution layers, a convolution output tensor generated by each of the convolution layers is rectified by one of the activation layers into non-zero outputs and zero outputs, determining the redundancy ratios of the convolution layers in the first model comprises:
   calculating an effective probability respectively for each of the convolution layers according to a ratio of the non-zero outputs; and
   calculating an effective flop count respectively for each of the convolution layers, wherein the effective flop count is calculated by a product between an original flop count and the effective probability.

5. The method of claim 2, wherein the first model of the convolutional neural network comprises a plurality of first convolution layers, a pooling layer, a plurality of second convolution layers arranged in the sequential order, reducing the channel widths of the convolution layers in the first model comprises:
   grouping the first convolution layers into a first macroblock and the second convolution layers into a second macroblock;
   reducing channel widths of the second convolution layers in the second macroblock in response to any one of the second convolution layers is in the enhancement layer group; and
   reducing channel widths of the first convolution layers in the first macroblock in response to any one of the first convolution layers is in the enhancement layer group.

6. The method of claim 5, wherein in response to the channel widths in the second macroblock and the channel widths in the first macroblock are both reduced, the channel widths in the second macroblock are reduced with a higher proportion compared to the channel widths in the first macroblock.

7. The method of claim 1, wherein the first model is a pre-trained model of the convolutional neural network, the pre-trained model comprises the convolution layers with the channel widths in default amounts, the second model is formed to comprise the convolution layers with the channel widths in reduced amounts, the reduced amounts are lower than or equal to the default amounts.

8. The method of claim 1, wherein the channel widths of the convolution layers correspond to amounts of convolution filters in each of the convolution layers.

9. The method of claim 1, wherein the first model comprises M convolution layers in the sequential order, M is a positive integer, in response to a channel width in a $M^{th}$ convolution layer of the first model and another channel width in a $(M-1)^{th}$ convolution layer of the first model are both reduced, the channel width in the $M^{th}$ convolution layer is reduced with a higher proportion compared to the channel width in the $(M-1)^{th}$ convolution layer.

10. The method of claim 1, wherein the second model of the convolutional neural network is utilized to recognize an incoming image, and the second model is further utilized to generate a label corresponding to the incoming image, to detect an object in the incoming image or to segment a foreground object from a background of the incoming image.

11. An electronic apparatus, suitable for adjusting a convolution neural network, the electronic apparatus comprising:
    a data storage, configured to store a first model of the convolution neural network, the first model of the convolution neural network comprising a plurality of convolution layers; and
    a processor, coupled with the data storage, the processor being configured to:
        determine a plurality of receptive field widths of the convolution layers in the first model of the convolutional neural network, wherein the receptive field widths of the convolution layers are determined by calculating widths of projective regions on an input image affecting one feature point in convolution output tensors of the convolution layers;
        reducing a plurality of channel widths of the convolution layers in the first model into a plurality of reduced channel widths according to the receptive field widths of the convolution layers and an input image width;
        form a structure of a second model of the convolutional neural network according to the reduced channel widths; and
        train the second model of the convolutional neural network.

12. The electronic apparatus of claim 11, wherein the processor is configured to reduce the channel widths of the convolution layers in the first model by:
    classifying each of the convolution layers in the first model into one of a base layer group and an enhancement layer group by comparing the receptive field widths of the convolution layers in the first model with a threshold positively related to the input image width;
    determining a plurality of redundancy ratios of the convolution layers in the first model according to a partial calculation amount of the enhancement layer group relative to a total calculation amount of the base layer group and the enhancement layer group; and
    reducing the channel widths of the convolution layers in the first model into the reduced channel widths according to the redundancy ratios of the convolution layers.

13. The electronic apparatus of claim 12, wherein in response to a first one of the convolution layers has a receptive field width lower than the threshold positively related to the input image width, the processor classifies the first one of the convolution layers in the first model into one of the base layer group, and
    in response to a second one of the convolution layers has a receptive field width exceeding the threshold positively related to the input image width, the processor classifies the second one of the convolution layers in the first model into one of the enhancement layer group.

14. The electronic apparatus of claim 12, wherein the convolutional neural network further comprises a plurality of activation layers, each of the activation layers are arranged after one of the convolution layers, a convolution output tensor generated by each of the convolution layers is rectified by one of the activation layers into non-zero outputs and zero outputs, the processor is configured to determine the redundancy ratios of the convolution layers in the first model by:
    calculating an effective probability respectively for each of the convolution layers according to a ratio of the non-zero outputs; and
    calculating an effective flop count respectively for each of the convolution layers is calculated by a product between an original flop counts and the effective probability.

15. The electronic apparatus of claim 12, wherein the first model of the convolutional neural network comprises a plurality of first convolution layers, a pooling layer, a plurality of second convolution layers arranged in the sequential order, the processor is configured to reduce the channel widths of the convolution layers in the first model by:
    grouping the first convolution layers into a first macroblock and the second convolution layers into a second macroblock;
    reducing channel widths of the second convolution layers in the second macroblock in response to any one of the second convolution layers is in the enhancement layer group; and
    reducing channel widths of the first convolution layers in the first macroblock in response to any one of the first convolution layers is in the enhancement layer group.

16. The electronic apparatus of claim 15, wherein in response to the channel widths in the second macroblock and the channel widths in the first macroblock are both reduced, the channel widths in the second macroblock are reduced with a higher proportion compared to the channel widths in the first macroblock.

17. The electronic apparatus of claim 11, wherein the first model is a pre-trained model of the convolutional neural network, the pre-trained model comprises the convolution layers with the channel widths in default amounts, the second model is formed to comprise the convolution layers with the channel widths in reduced amounts, the reduced amounts are lower than or equal to the default amounts.

18. The electronic apparatus of claim 11, wherein the channel widths of the convolution layers correspond to amounts of convolution filters in each of the convolution layers.

19. The electronic apparatus of claim 11, wherein the first model comprises M convolution layers in the sequential order, M is a positive integer, in response to a channel width in a $M^{th}$ convolution layer of the first model and another channel width in a $(M-1)^{th}$ convolution layer of the first model are both reduced, the channel width in the $M^{th}$ convolution layer is reduced with a higher proportion compared to the channel width in the $(M-1)^{th}$ convolution layer.

20. The electronic apparatus of claim 11, wherein the second model of the convolutional neural network is utilized by the processor to recognize an incoming image, the second model is further utilized by the processor to generate a label corresponding to the incoming image, to detect an object in the incoming image or to segment a foreground object from a background of the incoming image.

* * * * *